United States Patent [19]

Lyons et al.

[11] Patent Number: 5,191,458

[45] Date of Patent: Mar. 2, 1993

[54] OPTICAL ELECTRONIC MULTIPLEXING REFLECTION SENSOR SYSTEM

[75] Inventors: Donald R. Lyons, Melville; Stanley M. Reich, Jericho, both of N.Y.

[73] Assignee: Grumman Aerospace Corporation, Bethpage, N.Y.

[21] Appl. No.: 713,503

[22] Filed: Jun. 12, 1991

[51] Int. Cl.$^5$ .................. H04B 10/12; H04J 14/02
[52] U.S. Cl. ................................ 359/127; 359/173
[58] Field of Search ............ 250/227.21, 227.23; 359/115, 124, 127, 154, 173, 156, 165; 340/555, 556, 557

[56] References Cited

U.S. PATENT DOCUMENTS

| | | | |
|---|---|---|---|
| 4,777,661 | 10/1988 | Spillman | 359/115 |
| 4,814,604 | 3/1989 | Lequine | 250/227.21 |
| 5,062,153 | 10/1991 | Turpin et al. | 359/156 |

Primary Examiner—Edward L. Coles, Sr.
Assistant Examiner—R. Bacares
Attorney, Agent, or Firm—Daniel Tick; Richard Geib; Carl Evens

[57] ABSTRACT

An optical electronic multiplexing reflection sensor system for a plurality of Bragg sensors connected in series spaced relation in a plurality of single mode fiber optic cable buses. In each of the buses a unique address is provided each sensor function by wavelength selection. Each of a plurality of monochromators is coupled to a corresponding one of the buses and has a control connected to it for controlling the operation of the monochromator. A tunable laser source is coupled to each of the buses. A wavelength sweep generator is coupled to the laser source and provides outputs to the controls of the monochromators. Each of a plurality of photodetector receivers receives the output of a corresponding one of the monochromators and each has an output providing output signals indicating individual wavelengths of the Bragg sensors coupled to it. Each if a plurality of analog to digital converters is connected to the output of a corresponding one of the photodetector receivers. A backbone network connected to the analog to digital converters distributes and processes digitized data.

5 Claims, 3 Drawing Sheets

OPTICAL ELECTRONIC MULTIPLEXING REFLECTION SENSOR SYSTEM

BACKGROUND OF THE INVENTION

The present invention relates to an optical electronic multiplexing reflection sensor system. More particularly, the invention relates to an optical electronic multiplexing system for selectively addressing group interferometric sensors.

The principal object of the invention is to provide a system for the efficient control, storage and monitoring of data from a plurality of strain and temperature sensors.

An object of the invention is to provide an effective and reliable system for the control, storage and monitoring of data from a plurality of strain and temperature sensors.

Another object of the invention is to provide an efficient and effective system for the control, storage and monitoring of data from a plurality of strain and temperature sensors.

Still another object of the invention is to provide a multiple sensing system which permits unique selection of a single function from a plurality of sensors.

Yet another object of the invention is to provide a multiple sensing system which is readily and facilely embedded in an aircraft as a network for smart structures and skins.

BRIEF SUMMARY OF THE INVENTION

The system of the invention includes a multi-element embedded fiber optic array for combining multiple fiber optic Bragg reflection and other forms of interferometric sensors. The sensors, which can be arranged as an array of discrete elements, or used individually, can measure both multiple strain and temperature effects. The multiplexing/demultiplexing system of the invention is passive and all optical, except for the control and detection functions. Individual sensor elements are selectively addressed using an optical tracking filter detection scheme. The network is described as a function of the Bragg sensor.

In accordance with the invention, an optical electronic multiplexing reflection sensor system comprises a plurality of fiber optic cable buses. Each of a plurality of groups of strain and temperature sensors is connected in series in a corresponding one of the buses, a unique address being provided each sensor function by wavelength selection in each of the buses. Demultiplexing means coupled to the buses demultiplexes the individual wavelengths. Detecting means detects analog data from a discrete sensor function. Digitizing means digitizes detected analog data. Backbone network means distributes and processes digitized data.

The demultiplexing means comprises a laser source coupled to each of the buses and a plurality of monochromators each coupled to a corresponding one of the buses and to the laser source. Each of the monochromators has control means connected thereto for controlling the operation of the monochromator to which it is connected.

The detecting means comprises a plurality of photodetector receivers each receiving the output of a corresponding one of the monochromators and each having an output providing output signals indicating individual wavelengths of the sensors coupled thereto.

The laser source of the demultiplexing means comprises a tunable laser source.

In accordance with the invention, an optical electronic multiplexing reflection sensor system comprises a plurality of single mode fiber optic cable buses. A plurality of bi-directional couplers is coupled in series spaced relation in each of the buses. Each of a plurality of Bragg sensors is connected to a corresponding one of the couplers via a single mode secondary fiber optic cable, whereby in each of the buses a unique address is provided each sensor function by wavelength selection. Each of a plurality of monochromators is coupled to a corresponding one of the buses. Each of the monochromators having control means connected thereto for controlling the operation of the monochromator to which it is connected. A tunable laser source coupled to each of the buses. A wavelength sweep generator is coupled to the laser source and provides outputs to the control means of the monochromators. Each of a plurality of photodetector receivers receives the output of a corresponding one of the monochromators and each has an output providing output signals indicating individual wavelengths of the Bragg sensors coupled thereto. Each of a plurality of analog to digital converters is connected to the output of a corresponding one of the photodetector receivers. A backbone network is connected to the analog to digital converters for distributing and processing digitized data.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENT

Figure 1:
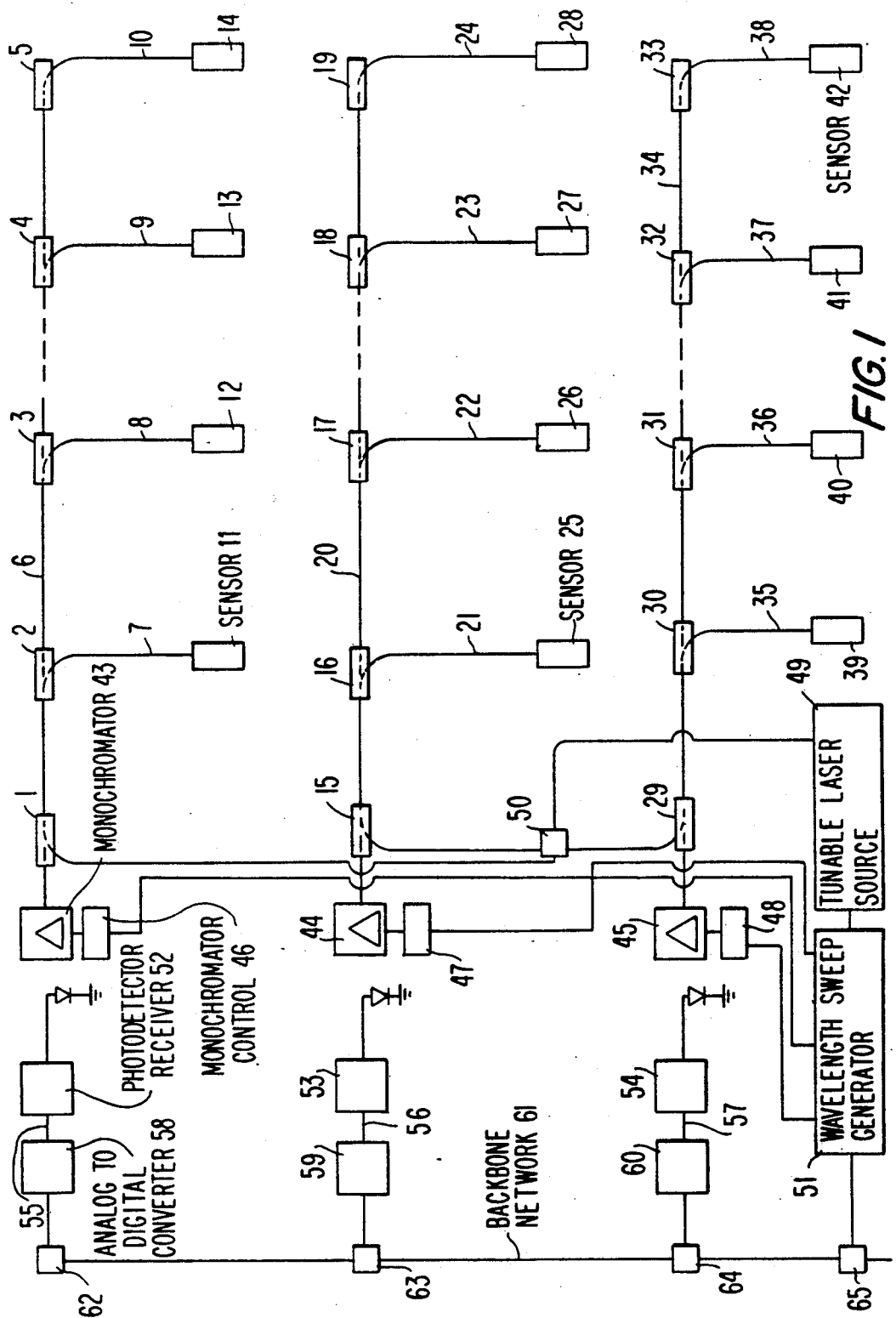
FIG. 1 is a block circuit diagram of an embodiment of the optical electronic multiplexing reflection sensor system of the invention.

An embodiment of the optical electronic multiplexing reflection sensor system of the invention is shown in FIG. 1. A plurality of bi-directional couplers or taps 1 to 5, of any suitable known type, are coupled in series spaced relation in a single mode fiber optic cable bus 6 of any suitable known type. Single mode secondary fiber optic cables 7, 8, 9 and 10 are coupled to the bus 6 via the couplers 2, 3, 4 and 5, respectively. Bragg sensors, or any suitable known strain and temperature sensors, 11, 12, 13 and 14 are connected to the fiber optic cables 7, 8, 9 and 10, respectively.

Any suitable number of additional fiber optic cable buses are included in the system of the invention, which, however, discloses three such buses in FIG. 1. Thus, a second plurality of bi-directional couplers 15 to 19, of any suitable known type, are coupled in series spaced relation in a second single mode fiber optic cable bus 20 of any suitable known type. Single mode secondary fiber optic cables 21, 22, 23 and 24 are coupled to the bus 20 via the couplers 16, 17, 18 and 19, respectively. Bragg sensors, or any suitable known strain and temperature sensors, 25, 26, 27 and 28 are connected to the fiber optic cables 21, 22, 23 and 24, respectively.

A third plurality of bi-directional couplers 29 to 33, of any suitable known type, are coupled in series spaced relation in a third single mode fiber optic cable bus 34 of any suitable known type. Single mode secondary fiber optic cables 35, 36, 37 and 38 are coupled to the bus 34 via the couplers 30, 31, 32 and 33, respectively. Bragg sensors, or any suitable known strain and temperature sensors, 39, 40, 41 and 42 are connected to the fiber optic cables 35, 36, 37 and 38, respectively.

In each of the buses 6, 20 and 34 a unique address is provided each sensor function by wavelength selection. Thus, each of the sensors in an individual bus can be independently accessed. Since each of the buses 6, 20, 34, and so on, is uniquely selected, wavelengths may be repeated from bus to bus, thereby permitting a very large number of sensors 11 to 14, 25 to 28, 39 to 42, and so on, to be supported. The limit to the number of individual sensors is determined by the reflection coefficient of the sensor, the coupling ratio of the coupler 2 to 5, 16 to 19, 30 to 33, and so on, the fiber transmission loss, the signal to noise ration of the receiver and the dynamic range. Since single mode optic fiber is used in the sensor and distribution system, transmission loss must be considered, even in short bus applications.

The factor which limits the number of bus couplers or taps 1 to 5, 15 to 19, 29 to 33, and so on, is typically the receiver dynamic range, which sets the difference between the return from the first and the last sensor. For sensor applications, receiver bandwidths are narrow, usually less than 2 mHz. This results in a dynamic range in the order of 35 to 40 db for a signal to noise ratio of 20 db. At least ten couplers may be supported for sensors with a 0.5 reflection coefficient before the dynamic range is exceeded. An individual Bragg reflection sensor can support more than sixteen discrete wavelengths, although the number of sensors is determined by the number of couplers the bus can support.

As shown in FIG. 1, a plurality of monochromators 43, 44 and 45 of any suitable known type are provided. The monochromator 43 is coupled to the bus 6. The monochromator 44 is coupled to the bus 20. The monochromator 45 is coupled to the bus 34. The monochromator 43 is connected to a monochromator control 46 of any suitable known type. The monochromator 44 is connected to a monochromator control 47. The monochromator 45 is connected to a monochromator control 48. The monochromator controls 46, 47 and 48 function to adjust the wavelength selectivity of the vacuum as a function of time, such that the receiver sensitivity is optimized.

A tunable laser source 49, of any suitable known type, is coupled to each of the buses 6, 20 and 34 via the coupler 1, the coupler 15 and the coupler 29 via a star coupler 50, whereby it is coupled to the monochromators 43, 44 and 45. The laser source 49 functions as a scanning laser and scans the monochromators 43, 44 and 45 via a wavelength sweep generator 51, of any suitable known type, connected between said laser source and the monochromator controls 46, 47 and 48, thereby demultiplexing the individual addresses or wavelengths of the sensors 11 to 14, 25 to 28, 39 to 42, and so on.

A plurality of photodetector receivers 52, 53 and 54, of any suitable known type, are provided, as shown in FIG. 1, in operative proximity with the monochromators 43, 44 and 45, respectively. The photodetector receiver 52 receives the output of the monochromator 43 and has an output 55 providing output signals indicating individual wavelengths of the sensors 11 to 14 coupled to said monochromator. The photodetector receiver 53 receives the output of the monochromator 44 and has an output 56 providing output signals indicating individual wavelengths of the sensors 25 to 28 coupled to said monochromator. The photodetector receiver 54 receives the output of the monochromator 45 and has an output 57 providing output signal indicating individual wavelengths of the sensors 39 to 42 coupled to said monochromator.

The photodetector receivers 52, 53 and 54 combined with the monochromators 43, 44 and 45, respectively, function to detect analog data from a discrete sensor function. The information concerning such detecting is digitized by a plurality of analog to digital converters 58, 59 and 60, of any suitable known type. The analog to digital converter 58 is connected to the output 55 of the photodetector receiver 52. The analog to digital converter 59 is connected to the output 56 of the photodetector receiver 53. The analog to digital converter 60 is connected to the output 57 of the photodetector receiver 54.

A backbone network 61, of any suitable known type, is connected to the analog to digital converters 58, 59 and 60 via node points 62, 63 and 64, respectively, and the wavelength sweep generator 51 is connected to said backbone network via a node point 65. The backbone network 61 may consist of fiber optic or coaxial cable and provides for control, data storage and monitoring of the system of FIG. 1. A central control processor (not shown in the FIGS.) is preferably connected to the backbone network 61.

The system of FIG. 1 is thus an optical electronic multiplexing arrangement for selectively addressing a group of sensors. The sensors are Bragg sensors, which are interferometric sensors, indicated as 11 to 14, 25 to 28 and 39 to 42. Bus selection is by electronic selection of a fiber optic line associated with one of, but not limited to, the three photodetector receiver, monochromator combinations 43, 52; 44, 53; 45, 54 (FIG. 1).

Figure 2:
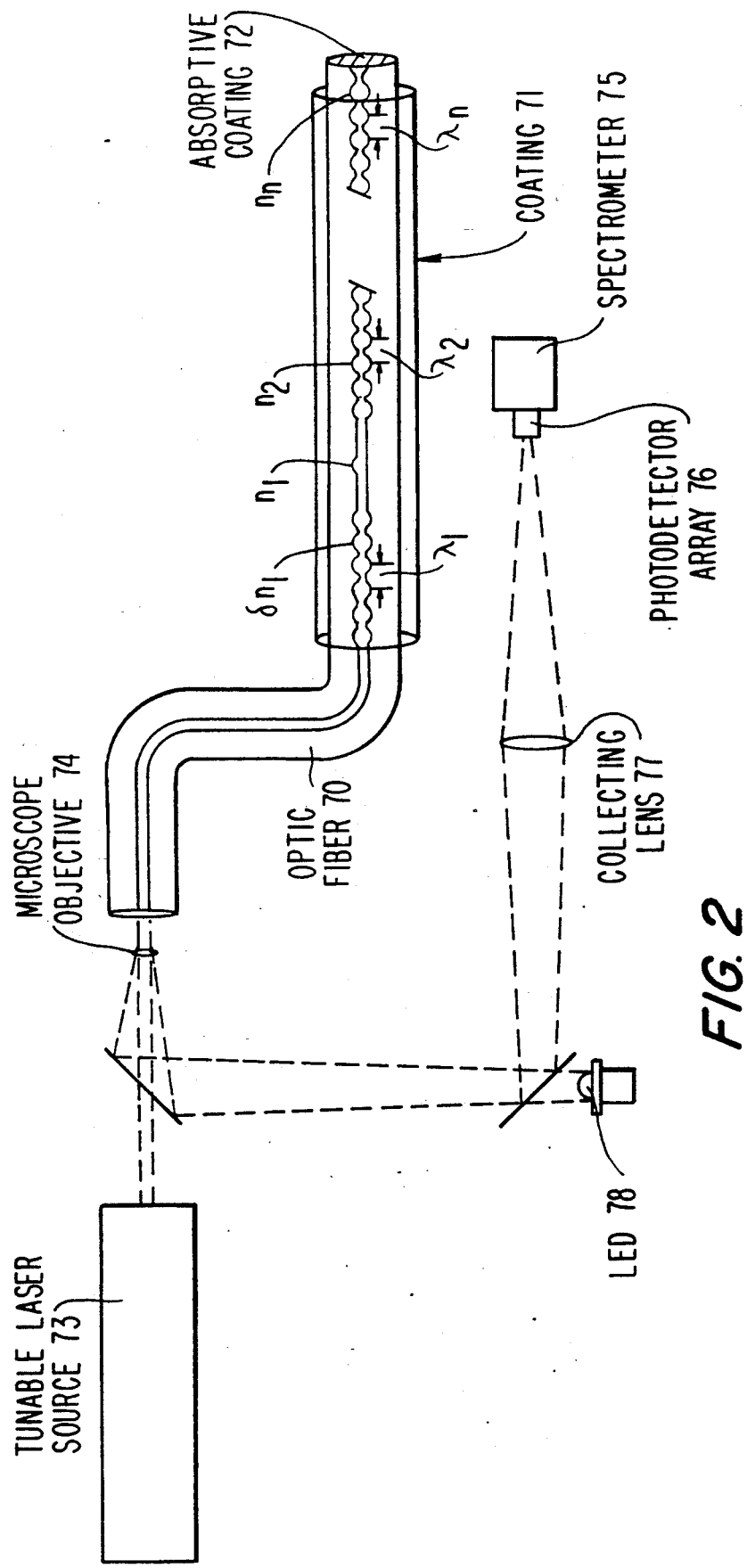
FIG. 2 is a schematic diagram of an embodiment of a single mode fiber strain and temperature sensor.

FIG. 2 illustrates an embodiment of a known strain and temperature Bragg reflection sensor which may be embedded in, and will sense distributed strain in, a structure. Each place of embedment of the sensor is identified by a specific optical wavelength. The Bragg sensor is a multiple function sensor comprising a plurality of permanent ultraviolet (UV) impressed gratings $n_1$ to $n_n$. Each of the UV impressed gratings $n_1$ to $n_n$ is associated with a particular strain, temperature, magnetic, or other fields as a function of where along the substrate it is coupled to an optic fiber 70 and coated with a coating 71 of prespecified material which functions to convert field energy variations into light intensity variations. The end of the optic fiber 70 is coated with an absorptive coating 72 of dark material, of any suitable known type, which functions to alternate interfering Fresnel reflections.

The basic principle of the sensor of FIG. 2 is the use of the photorefractive properties of germanium doped silica fibers for the UV induction of permanent diffraction gratings of different wavelengths and located at spatially distinct positions in the single optic fiber 70. The UV induced gratings function independently to reflect multiple wavelengths of light. The amplitude and wavelength of the reflections are proportional to the induced strains and strain locations, respectively.

In the sensor of FIG. 2, a tunable laser source 73, of any suitable known type, interrogates changes in the Bragg reflection from the optic fiber 70 via a microscope objective 74. The reflected energy is sensed by a spectrometer 75, of any suitable known type, which tracks the tunable laser wavelength, via a photodetector array 76, of any suitable known type, and a collecting lens 77. A light emitting diode (LED) 78, of any suitable known type, is utilized as an alignment probe or alternate light source.

Figure 3:
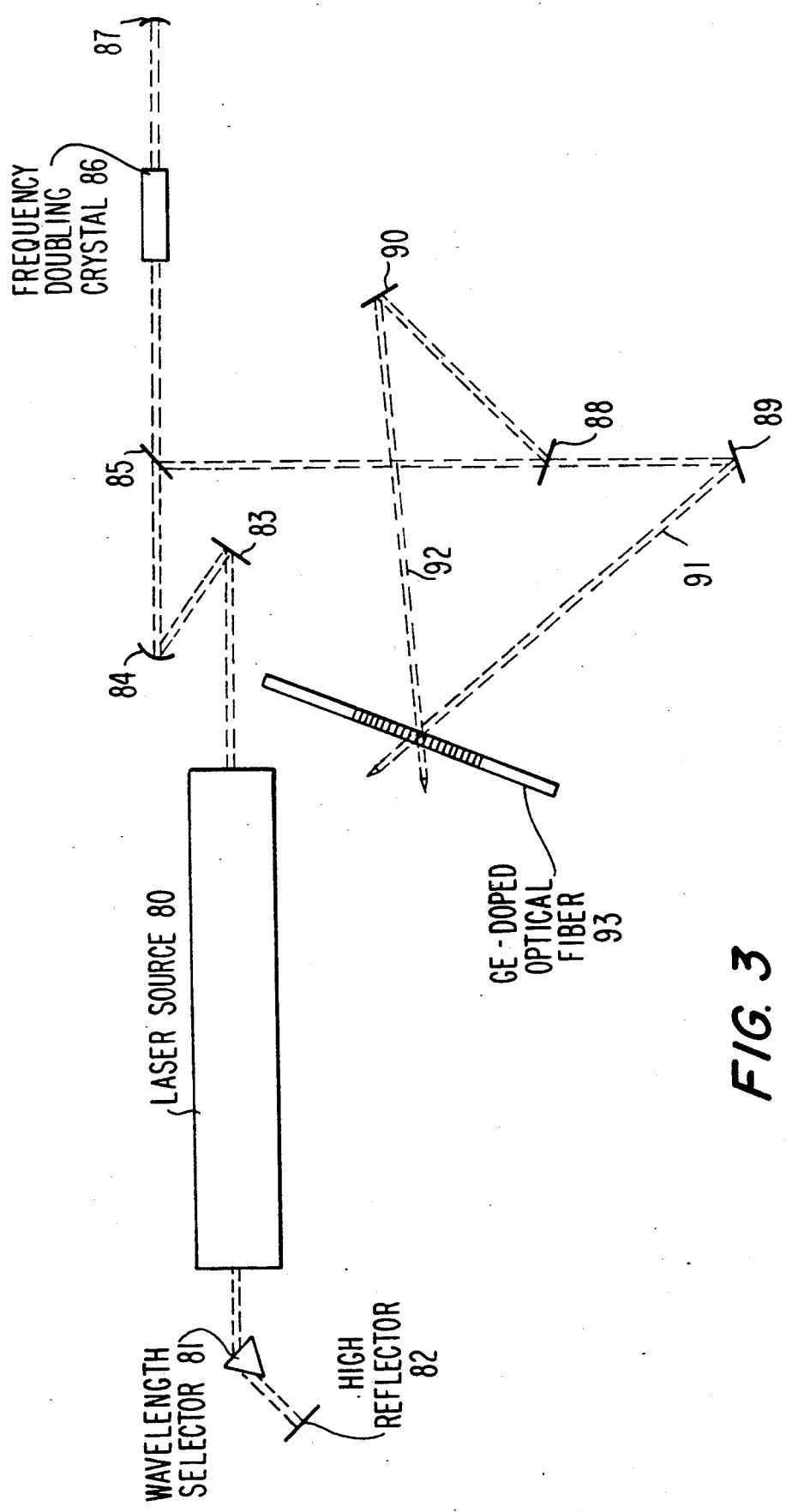
FIG. 3 is a schematic diagram of a method for fabricating individual Bragg sensors.

FIG. 3 shows a method for fabricating individual Bragg sensors. More particularly, FIG. 3 illustrates an experimental setup for providing the gratings $n_1$ to $n_n$ (FIG. 2). An Argon ion laser source 80 transmits multispectral line light of which only the 488 nm wavelength remains cavity aligned after passing through a wavelength selector 81 to a flat high reflector 82 and also transmits 488 nm light to a flat high reflector 83 which reflects the light to a 40 cm radius of curvature concave high reflector 84. The high reflector 84 reflects the light to a dichroic mirror 85 which passes the 488 nm wavelength visible light through a frequency doubling crystal 86 to a 10 cm radius of curvature concave high reflector 87. The dichroic mirror 85, to obtain the proper beam waist within the crystal, which is located at 45° with respect to the beam direction, functions to linearly transmit the UV light from the frequency doubling cavity and which comprises the high frequency reflector 84, the frequency doubling crystal 86 and the high reflector 87, reflects the UV light from the high reflector 87 and crystal 86. The frequency doubling crystal 86, which may comprise any suitable known frequency doubling crystal such as, for example, Beta Barium, Borate doubles, the frequency of the light transmitted to the high reflector 87, thereby creating the halved wavelength of such light, and doubling the frequency of the light reflected by said high reflector, thereby halving the wavelength of the light, so that the light reflected by the mirror 85 has a wavelength of 244 nm.

The light reflected by the mirror 85 impinges upon and passes through a dichroic mirror 88. The light passing through the mirror 88 impinges upon a flat reflector 89. The light reflected by the mirror 88 at 45° is transmitted to a flat reflector 90. Each of the reflectors 89 and 90 reflects the impinging light at 45°. Thus, the two beams of UV light 91 and 92 intersect each other and a Germanium-doped optical fiber 93 is positioned at the intersection of said two light beams, as shown in FIG. 3.

The method of the invention is for monitoring a plurality of groups of strain and temperature sensors, each group being connected in series in a corresponding one of a plurality of fiber optic cable buses, a unique address being provided each sensor function by wavelength selection in each of said buses. The steps of the method of the invention are demultiplexing the individual wavelengths of the buses, detecting analog data from a discrete sensor function, digitizing detected analog data, and distributing and processing digitized data.

Although shown and described in what is believed to be the most practical and preferred embodiment, it is apparent that departures from the specific method and design described and shown will suggest themselves to those skilled in the art and may be made without departing from the spirit and scope of the invention. We, therefore, do not wish to restrict ourselves to the particular construction described and illustrated, but desire to avail ourselves of all modifications that may fall within the scope of the appended claims.

We claim:

1. An optical electronic multiplexing reflection sensor system comprising
   a plurality of fiber optic cable buses;
   a plurality of groups of strain and temperature sensors, each of said groups being connected in series in a corresponding one of said buses, a unique address being provided each sensor function by wavelength selection in each of said buses;
   demultiplexing means coupled to said buses for demultiplexing the individual wavelengths, said demultiplexing means comprising a laser source coupled to each of said buses and plurality of monochromators each coupled to a corresponding one of said buses and to said laser source, each of said monochromators having control means connected thereto for controlling the operation of the monochromator to which it is connected;
   detecting means for detecting analog data from a discrete sensor function;
   digitizing means for digitizing detected analog data; and
   backbone network means for distributing and processing digitized data.

2. An optical electronic multiplexing reflecting sensor system as claimed in claim 1, wherein said detecting means comprises a plurality of photodetector receivers each receiving the output of a corresponding one of said monochromators and each having an output providing output signals indicating individual wavelengths of the sensors coupled thereto.

3. An optical electronic multiplexing reflection sensor system as claimed in claim 1, wherein said laser source of said demultiplexing means comprises a tunable laser source.

4. An optical electronic multiplexing reflection sensor system comprising
   a plurality of single mode fiber optic cable buses;
   a plurality of bi-directional couplers coupled in series spaced relation in each of said buses;
   a plurality of Bragg sensors, each connected to a corresponding one of said couplers via a single mode secondary fiber optic cable, whereby in each of said buses a unique address is provided each sensor function by wavelength selection;
   a plurality of monochromators each coupled to a corresponding one of said buses, each of said monochromators having control means connected thereto for controlling the operation of the monochromator to which it is connected;
   a tunable laser source coupled to each of said buses;
   a wavelength sweep generator coupled to said laser source and providing outputs to said control means of said monochromators;
   a plurality of photodetector receivers each receiving the output of a corresponding one of said monochromators and each having an output providing output signals indicating individual wavelengths of the Bragg sensors coupled thereto;
   a plurality of analog to digital converters each connected to the output of a corresponding one of said photodetector receivers; and
   a backbone network connected to said analog to digital converters for distributing and processing digitized data.

5. A method of monitoring a plurality of groups of strain and temperature sensors, each group being connected in series in a corresponding one of a plurality of fiber optic cable buses, a unique address being provided each sensor function by wavelength selection in each of said buses, said method comprising the steps of demultiplexing the individual wavelengths of said buses by coupling a laser source to each of said buses and coupling each of a plurality of monochromators to a corresponding one of said buses and to said laser source, each of said monochromators having control means connected thereto for controlling the operation of the monochromator to which it is connected;

detecting analog data from a discrete sensor function;

digitizing detected analog data; and distributing and processing digitized data.

* * * * *